United States Patent
Memmott et al.

(10) Patent No.: US 8,402,174 B2
(45) Date of Patent: Mar. 19, 2013

(54) HANDLING SENSORS IN A CONTEXT-AWARE PLATFORM WITH HINT SIGNALS

(75) Inventors: James Lester Memmott, Draper, UT (US); Atul N. Hatalkar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1124 days.

(21) Appl. No.: 12/340,516

(22) Filed: Dec. 19, 2008

(65) Prior Publication Data

US 2010/0161953 A1 Jun. 24, 2010

(51) Int. Cl.
*G06F 3/00* (2006.01)
(52) U.S. Cl. ............................. 710/15; 710/18
(58) Field of Classification Search .................. None
See application file for complete search history.

(56) References Cited

U.S. PATENT DOCUMENTS

| | | | |
|---|---|---|---|
| 8,028,053 B2 * | 9/2011 | Cho | 709/223 |
| 2006/0149905 A1 | 7/2006 | Park et al. | |
| 2008/0077661 A1 | 3/2008 | Jeon et al. | |

FOREIGN PATENT DOCUMENTS

| | | |
|---|---|---|
| JP | 2005-260914 | 9/2005 |
| JP | 2006-209774 | 8/2006 |
| WO | WO-2007/066887 A1 | 6/2007 |

OTHER PUBLICATIONS

Rainer Buhleier, Communication Pursuant to Article 94(3) EPC, Jul. 19, 2010, 5 pages, Application No. 09 252 763.9-2413, European Patent Office, Munich, Germany.
Office Action for Japanese Patent Application No. P2009-280506 mailed May 21, 2012, 11 pgs.
JP-2005-260914—Abstract in English.
JP-2006-209774—Abstract in English.
First Office Action for Chinese Patent Application No. 200910215315.7 mailed May 4, 2012, 3 pgs.

* cited by examiner

*Primary Examiner* — Idriss N Alrobaye
*Assistant Examiner* — Richard B Franklin
(74) *Attorney, Agent, or Firm* — Blakely, Sokoloff, Taylor & Zafman LLP (57) ABSTRACT

The context engine of a context aware platform may comprise a provider manager coupled to context providers and the provider manager may communicate with the context providers using application programming interfaces (API). To optimize the use of system resources, the provider manager may load/unload the context providers based on value of a load field of a hint signal or on prediction values. The context providers is to activate a first set of sensors of the plurality of sensors if the preferred activity level for the first set of sensors is set to activate state in the hint signal. The context providers is to deactivate a second set of sensors of the plurality of sensors if the preferred activity level for the first set of sensors is set to deactivate state in the hint signal.

18 Claims, 7 Drawing Sheets

| <<Interface>> | 510 |
|---|---|
| IProviderRegistration | |
| <<abstract>> RegisterProvider(aRegistrationinfo : ProviderRegistrationinfo) : Void <<abstract>> RemoveProvider(ProviderGuid : String) : Void | |

| ProviderRegistrationInfo |
|---|
| ProviderName: String<br>ProviderVersion: String<br>ProviderGuid : String<br>ProviderDescription : String<br>RegistrationDetails : XMLDoc&<br>ProviderURI : String |

| <<Interface>> | 520 |
|---|---|
| IProviderControl | |
| <<abstract>> StartProvider() : Void<br><<abstract>> StopProvider() : Void<br><<abstract>> ActivateContext(aContextName : String) : Void<br><<abstract>> DeactivateContext(aContextName : String) : Void<br><<abstract>> GetProviderData() : IProviderData& | |

| <<Interface>> | 530 |
|---|---|
| IProviderData | |
| <<abstract>> GetData(aContextName : String, aLocation : Location : aTime: DateTime) : String<br><<abstract>> GetProviderNotifier() : IProviderNotifier& | |

| <<Interface>> | 540 |
|---|---|
| IProviderNotifier | |
| <<abstract>> RegisterObserver(aObserver : IProviderDataObserver*) : void<br><<abstract>> RemoveObserver(aObserver : IProviderDataObserver*) : void | |

| <<Interface>> | 550 |
|---|---|
| IProviderDataObserver | |
| <<abstract>> EventContextUpdateAvailable(aContextName : String) : void<br><<abstract>> EventIdentifierOnline(aContextName : string) : void<br><<abstract>> EventIdentifierOffline(aContextName : string) : void | |

FIG. 8

HANDLING SENSORS IN A CONTEXT-AWARE PLATFORM WITH HINT SIGNALS

BACKGROUND

A context aware platform may understand itself, its user, and its surroundings and may adapt to the behavior, make decisions or act on behalf of the user without receiving explicit user inputs. The context aware platform may generate context information and based on the context information, the context aware platform may adapt without receiving explicit user inputs. The context information may be generated using the data provided by the sensors. The sensors may generate the data based on the inputs that the sensors sense.

The type and the disparity of the sensors that are available in the market place are ever increasing. The current context aware platforms lack the ability to handle disparate sensors. Also, the sensors and the associated front-end processing modules may consume significant amount of resources like battery power, network bandwidth, processing cycles, and such other similar resources. The current context aware platforms lack the ability to handle the sensors to conserve such resources.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a technique to handle sensors in a context aware platform. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
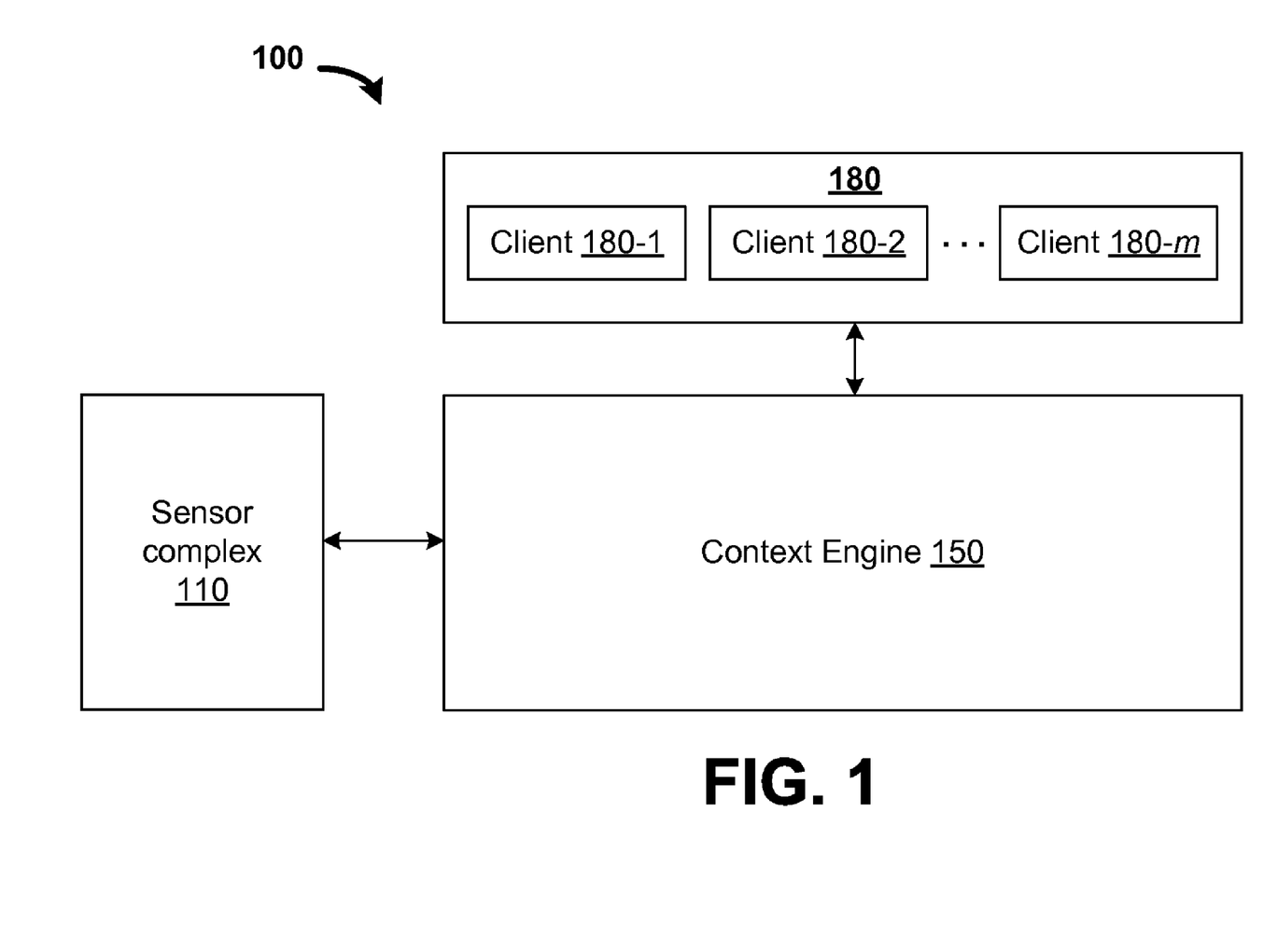
FIG. 1 illustrates a context aware platform 100, which may handle disparate sensors while conserving resources consumed by the disparate sensors according to one embodiment.

An embodiment of a context aware platform 100, which may handle disparate sensors while conserving resources consumed by the disparate sensors is illustrated in FIG. 1. In one embodiment, the context aware platform 100 may comprise a sensor complex 110, a context engine 150, and clients 180.

In one embodiment, the clients 180 may include one or more client entities such as client 180-1 to 180-N. In one embodiment, the client entities 180-1 to 180-N may include user-level applications, operating system, platform utilities, and tools. In one embodiment, the clients 180 may arrive at decisions and actions to be performed using contextual information received from the context engine 150. In one embodiment, the clients 180 may receive the contextual information from the context engine 150 either synchronously or asynchronously. In one embodiment, the clients 180 may customize the context-processing performed by the context engine 150.

In one embodiment, the sensor complex 110 may comprise an array of disparate sensors, which may include physical and logical sensors. In one embodiment, the sensors may provide data from which contextual information may be generated. In one embodiment, the sensors may be hardware components embedded into the context aware platform 100 or coupled to the context aware platform 100 using components such as wired/wireless networks. In one embodiment, the sensor complex 110 may be coupled to the context engine 150. In one embodiment, the sensors may generate data based on the sensing of the parameters such as battery charge, active radio, location, humidity, blood pressure and activity level of the user of the context aware platform 100, memory and processor usage and such other parameters. In one embodiment, the sensors of the sensor complex 110 may be activated and/or deactivated dynamically to provide unified way for the context aware platform 100 to request and receive context information from the sensors and also to conserve the resources consumed by the sensors.

In one embodiment, the context engine 150 may dynamically activate and deactivate the sensors of the sensor complex 110 from the context aware platform 100. In one embodiment, the context engine 150 may generate hint signals using the information, which may include indicators to the use of sensors by the clients 180. In one embodiment, the context engine 150 may also generate hint signals based on the information, which may include indicators to the use of sensors by the context engine 150. In one embodiment, the context engine 150 may activate one or more sensors of the sensor complex 110 based on the hint signal. In one embodiment, the context engine 150 may also use the hint signal to deactivate one or more sensors coupled to the context aware platform 100.

In one embodiment, activating and/or deactivating of sensors based on the hint signal may provide a unified approach to couple the sensors to the context aware platform 100. In one embodiment, the context engine 150 may track an elapsed time period for which a sensor may not be in use and if the elapsed time period is more than a first idle threshold value, the context engine 150 may deactivate the sensor, which may conserve resources. In one embodiment, the context engine 150 may also predict a future time point at which a sensor may be used and if the future time point is greater than a second idle threshold value, the context engine 150 may deactivate the sensor, which may conserve resources consumed by the sensors.

Figure 2:
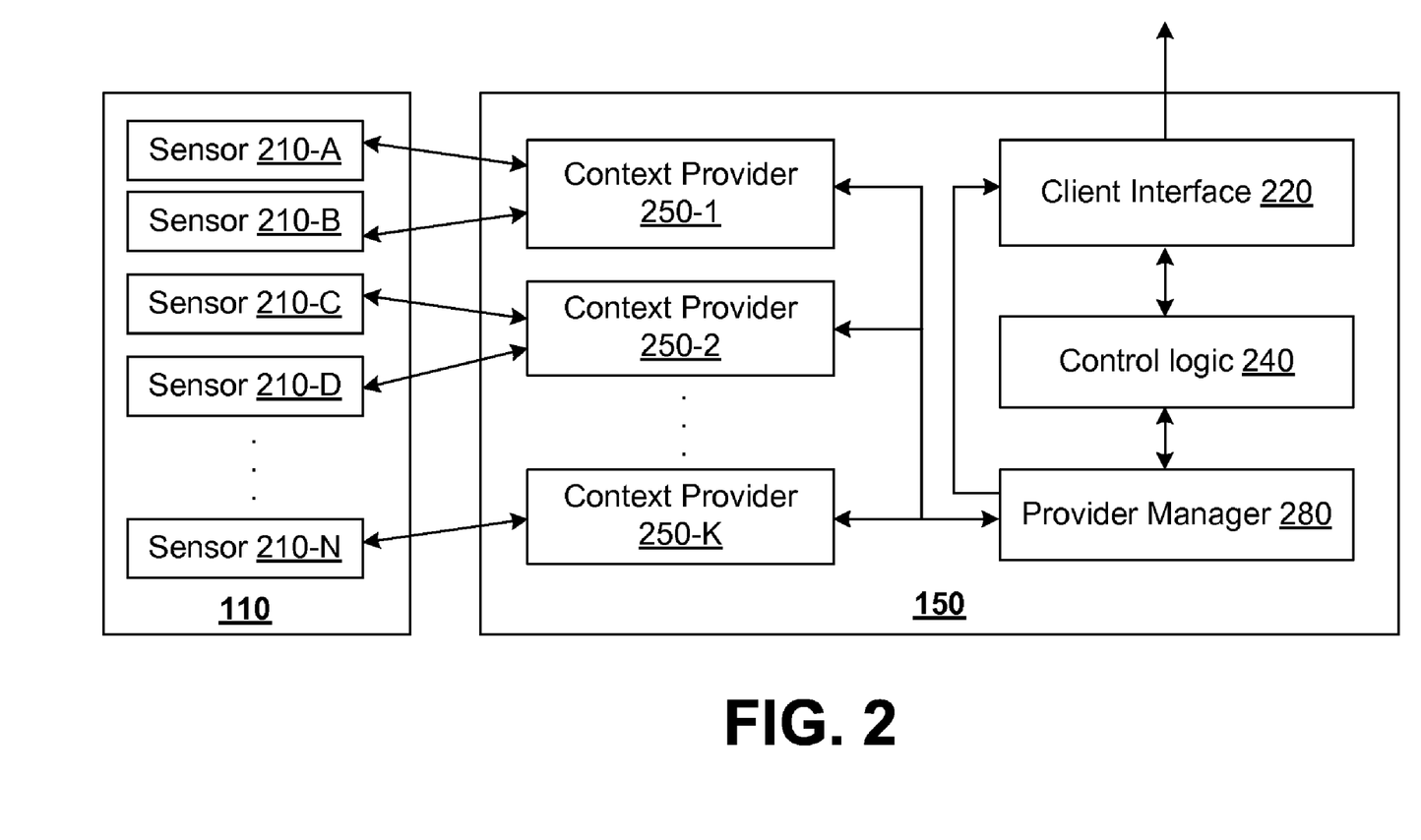
FIG. 2 illustrates a context engine of the platform 100, which may handle disparate sensors while conserving resources consumed by the disparate sensors according to one embodiment.

In one embodiment, the hint signal may be generated in direct response to a request from a client 180 for sensor data of one or more of the sensors 210. In one embodiment, the direct response may include reference counting such that while at least the client 180-1 uses the sensor 210-A, the sensor 210-A may be activated and while the last client 180-K, for example, completes using the sensor 210-A, the sensor 210-A may be deactivated.

In other embodiment, in addition to monitoring the usage of each sensors 210 by the clients 180, the context engine 150 may use additional heuristics, or inferencing, or historical trend analysis to determine time points at which the sensors 210 may be activated or deactivated. In yet other embodiment, the context engine 150, independent of any client activity, may use other mechanisms to anticipate the best use of sensors 210 to activate or deactivate each of the sensors 210.

An embodiment of the context engine 150, which may support unified approach to activate and/or deactivate sensors, while causing conservation of resources consumed by the sensors is illustrated in FIG. 2. In one embodiment, the context engine 150 may comprise a client interface 220, a control logic 240, one or more context providers 250-1 to 250-K, and a provider manager 280.

In one embodiment, the client interface 220 may couple the clients 180 to the context engine 150. In one embodiment, the client interface 220 may receive contextual information from the provider manager 280 after receiving an indication from the control logic 240. In one embodiment, the client interface 220 may transfer the contextual information to one or more of the appropriate clients 180-1 to 180-m based on control values provided by the control logic 240. In one embodiment, the client interface 220 may also transfer control data generated by the clients 180 to the context engine 150. In one embodiment, the control data may include rules, indications of sensor usage, and such other similar data.

In one embodiment, the control logic 240 may receive an indication from the provider manager 280 and may cause the contextual information to be transferred from the provider manager 280 to the client interface 220. In one embodiment, the control logic 240 may generate the control values based on the inputs received from the provider manager 280. In one embodiment, the control logic 240 may provide control values to the client interface 220.

In one embodiment, the provider manager 280 may load and/or unload the context providers 250-1 to 250-K based on the preferred activity levels of the sensors 210 or predicted activity levels of the sensors 210. In one embodiment, the provider manager 280 may program the load field of the hint signal to a specific logic value, for example, '1' to load and '0' to unload the context provider 250-1. In one embodiment, the provider manager 280 may also program the activity level fields of the hint signal with a first logic level or a second logic value to either activate or deactivate the sensors 210-A and 210-B coupled to the context provider 250. In one embodiment, the provider manager 280 may support provider application program interface (API) to communicate with the context providers 250-1 to 250-K. In one embodiment, the provider API may enable the provider manager 280 to support activities such as initialization, registration, loading, getting contextual information, unloading, un-installation of the context providers 250-1 to 250-K. In one embodiment, the provider manager 280 may support activities such as installation, registration and un-installation of the context providers 250-1 to 250-K even while the control engine 150 may be in an inactive state.

In one embodiment, the provider manager 280 may provide hint signals to the context providers 250-1 to 250-K using provider APIs. In one embodiment, the provider manager 280 may start the context providers 250-1 to 250-K before getting the contextual information from the context providers 250-1 to 250-K using the provider API. In one embodiment, the provider manager 280 may get the contextual information from the context provider 250-1 to 250-K synchronously or asynchronously. In one embodiment, the provider manager 280 may provide the contextual information to the client interface 220 in response to receiving a control signal from the control logic 240. In one embodiment, the provider manager 280 may provide indications to the control logic 240 that may enable the control logic 240 to cause the contextual information to be transferred to an appropriate client 180-1 to 180-m.

In one embodiment, the context provider 250-1 may support sensors 210-A and 210-B, the context provider 250-2 may support sensors 210-C and 210-D, and the context provider 250-K may support sensor 210-N. In one embodiment, the context providers 250-1 to 250-K may couple the sensors 210-A to 210-N to the context engine 150. In one embodiment, the operation of the context provider 250-1 to activate and/or deactivate the sensors 210-A and 210-B is described below. However, the other context providers 250-2 to 250-K may operate in a similar mode to activate and/or deactivate the sensors 210-C to 210-N. To couple the sensors 210-A and 210-B to the context engine 150, in one embodiment, the context provider 250-1 may support protocols, interfaces, and signaling mechanism used by the sensors 210-A and 210-B. In one embodiment, the context provider 250-1 may also support a common-data access and control protocol, which may be provided in the form of a provider API (application program interface).

In one embodiment, the context provider 250-1 may be loaded if the load/unload field value of the hint signal equals a specific value (e.g., logic 1). In one embodiment, the loaded context provider 250-1 may retrieve the activity level field for the sensors 210-A and 210-B coupled to the context provider 250-1. In one embodiment, the context provider 250-1 may activate the sensor 210-A if the activity level field for 210-A of the hint signal represents a first logic level (e.g., 1) and may deactivate the sensor 210-B if the activity level field for 210-B of the hint signal represents a second logic level (e.g., 0). In one embodiment, the context provider 250-1, based on the activity level field of the sensors 210-A and 210-B, may activate the sensor 210-A and 210-B, or deactivate the sensors 210-A and 210-B, or activate the sensor 210-A and deactivate the sensor 210-B, or deactivate the sensor 210-A and activate the sensor 210-B. An embodiment of the provider API used for communication between the context providers 250-1 to 250-K and the provider manager 280 is described below.

Figure 3:
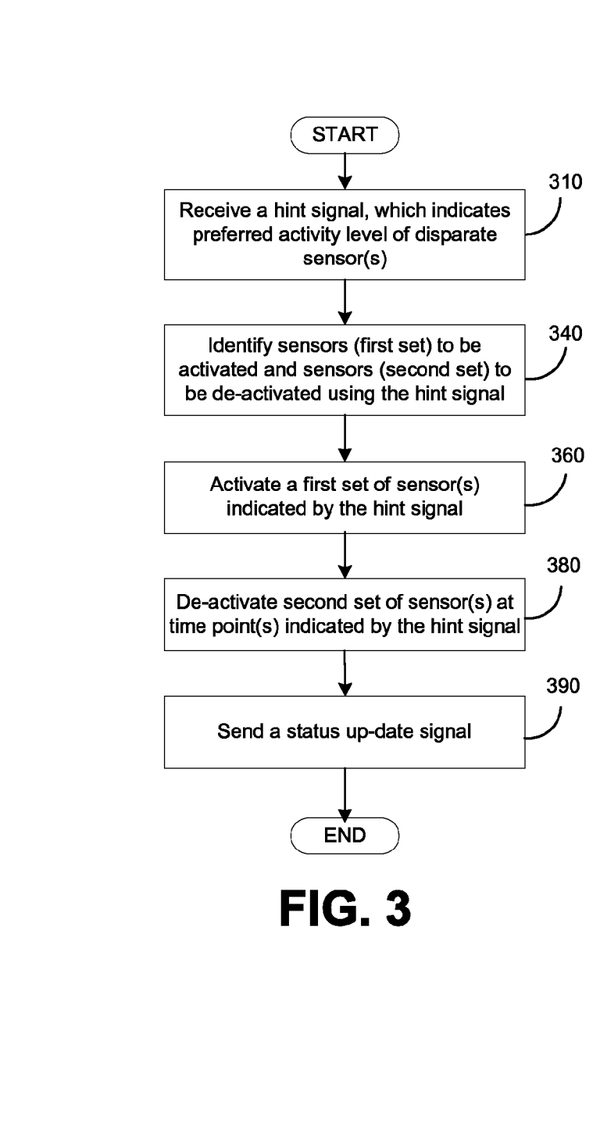
FIG. 3 is a flow-chart to illustrate the operation of a context provider, which may activate/deactivate disparate sensors to provide a unified approach to couple the disparate sensors to the context aware platform according to one embodiment.

An embodiment of an operation of the context provider 250-1, which may activate/deactivate disparate sensors to provide a unified approach to couple the disparate sensors to the context aware platform 100 is illustrated in FIG. 3.

In block 310, the context provider 250-1 may receive a hint signal, which may indicate the preferred activity level of the disparate sensors. In one embodiment, the hint signal may be received from the provider manager 280. In one embodiment, the hint signal may indicate that the sensor 210-A may be activated and the sensor 210-B may be deactivated, for example.

In block 340, the context provider 250-1 may identify the sensors (first set) that may be activated and sensors (second set) that may be de-activated. In one embodiment, the context provider 250-1 may identify that the sensor 210-A (first set) may be activated and the sensor 210-B (second set) may be de-activated.

In block 360, the context provider 250-1 may activate the first set (sensor 210-A). In one embodiment, the context provider 250-1 may send a signal to the sensor 210-A to activate the sensor 210-A.

In block 380, the context provider 250-1 may deactivate the second set of sensors (sensor 210-B). In one embodiment, the context provider 250-1 may send a signal to the sensor 210-B to deactivate the sensor 210-B.

In block 390, the context provider 250-1 may send a status-update signal to the provider manager 280.

Figure 4:
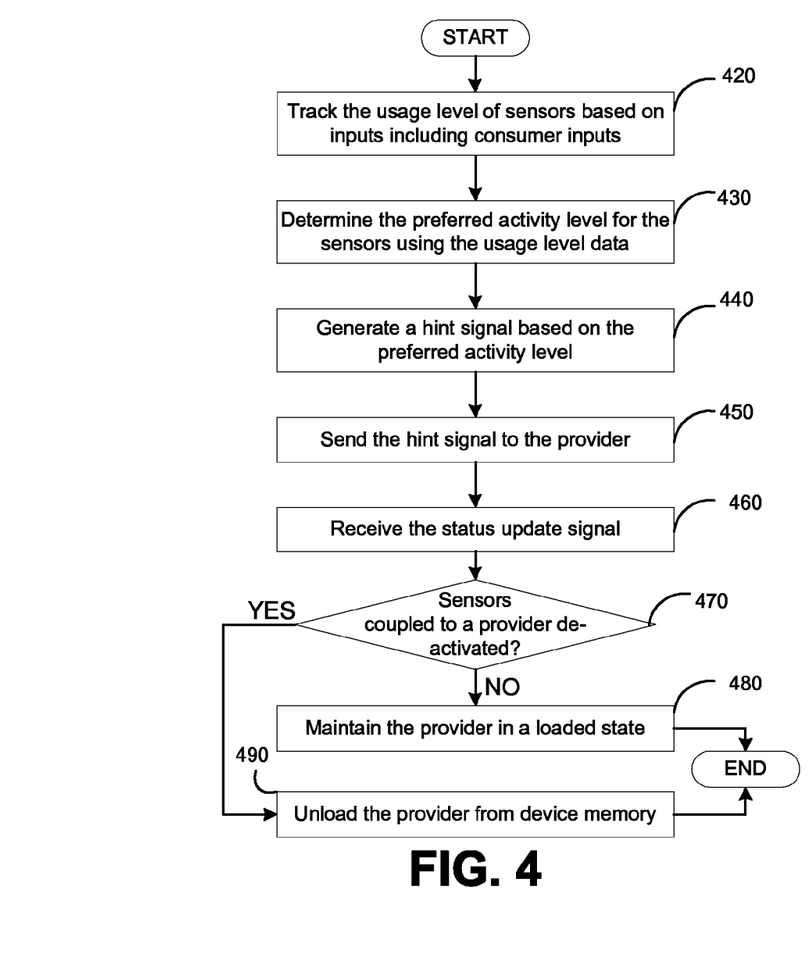
FIG. 4 is a flow-chart to illustrate the operation of a provider manager, which may cause loading or unloading of the context provider according to one embodiment.

An embodiment of an operation of the provider manager 280, which may communicate with the context provider 250-1 to provide a unified approach to handle disparate sensors while conserving resources consumed by the disparate sensors 210 is illustrated in FIG. 4

In block 420, the provider manager 280 may track the usage levels of the sensors based on the inputs provided by the clients 180. In one embodiment, the usage levels of the sensors may indicate that the client 180-2 may use the sensor 210-A within a time period X. Also, the usage levels of the sensors provided by the client 180-*m* may indicate that the sensor 210-B may not be used for next 'Y' time units.

In block 430, the provider manager 280 may determine the preferred activity level for the sensors 210-A and 210-B using the usage levels of the sensors tracked using the inputs provided by the clients 180. In one embodiment, the provider manager 280 may determine that the preferred activity level for the sensor 210-A may be equal to 'activate' (first logic level) and that of the sensor 210-B may equal to 'deactivate' (second logic level).

In block 440, the provider manager 280 may generate a hint signal based on the activity levels. In block 450, the provider manager 280 may send the hint signal to the context provider 250-1 using the provider API. In block 460, the provider manager 280 may receive a status-update signal after sending the hint signal.

In block 470, the provider manager 280 may check if all the sensors coupled to the context provider are deactivated. In one embodiment, the provider manager 280 may check if the sensors 210-A and 210-B coupled to the context provider 250-1 are deactivated and control passes to block 480 if the sensors (210-A and 210-B) coupled to the context provider 250-1 are not deactivated and control passes to block 490 otherwise.

In block 480, the provider manager 280 may maintain the loaded state of the context provider 250-1 as at least one sensor 210-A coupled to the context provider 250-1 is in activate state.

In block 490, the provider manager 280 may unload the context provider 250-1 if the sensors 210-A and 210-B coupled to the context provider 250-1 are deactivated.

In other embodiments, the provider manager 280 may perform speculative loading or unloading of the context providers 250 based on usage patterns of the sensors 210 by the client entities 180-1 to 180-*m*. In one embodiment, the provider manager 280 may speculate the usage of the sensors 210 by the clients 180 and may load the context provider 250 that may couple such sensors to the context aware platform 100. In other embodiments, the provider manager 280 may continue to maintain the context provider 250 in a loaded state to avoid, for example, frequent loading and unloading of the context provider 250.

In one embodiment, the prior usage patterns may include probability values which indicate a probability of use of the plurality of sensors by the client entities, wherein the usage patterns may include frequency values which indicate the frequency of use of the plurality of sensors by the client entities.

Figure 5:
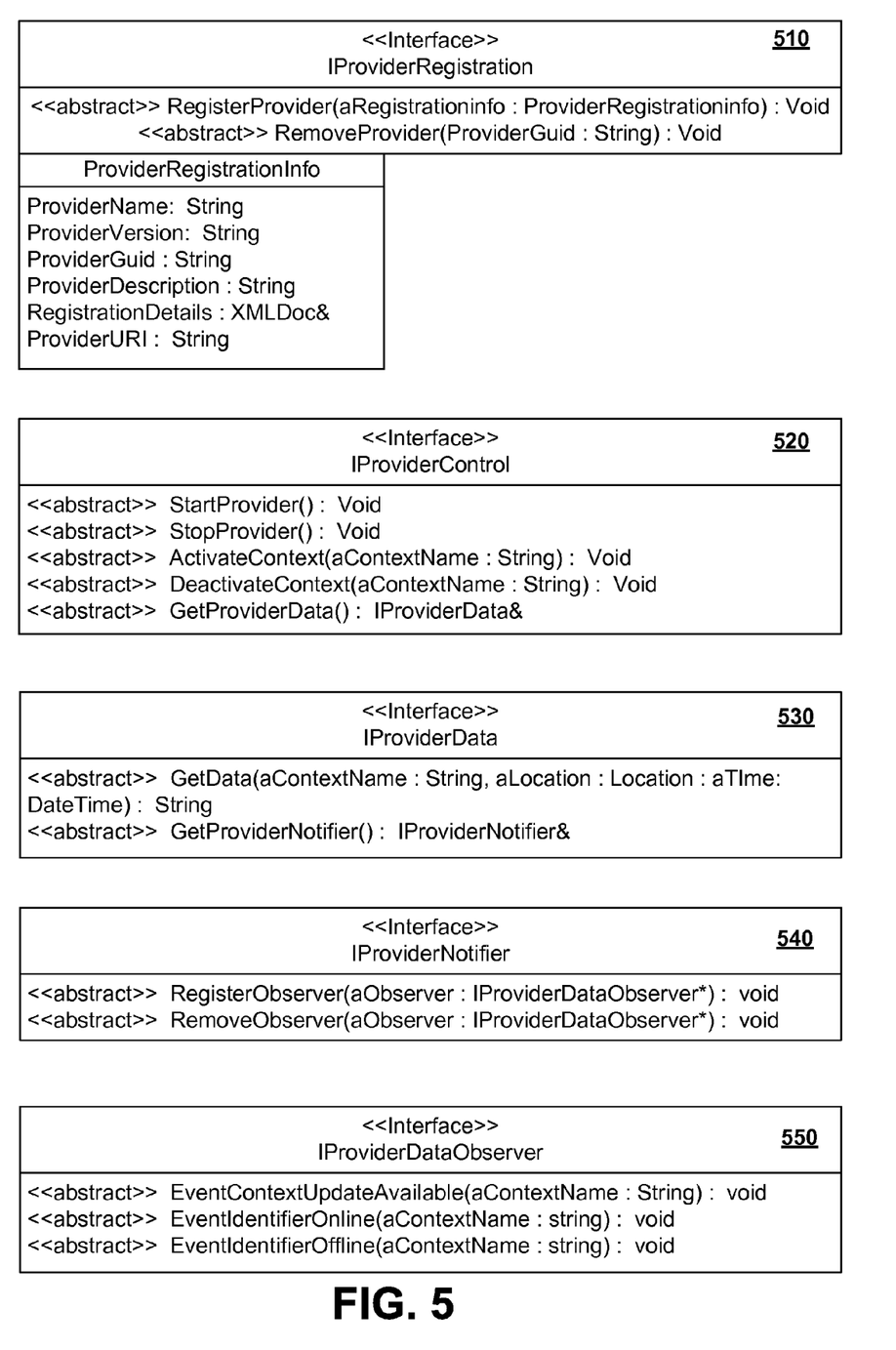
FIG. 5 illustrates an embodiment of a provider application programming interface (API).

An embodiment of the provider API is illustrated in FIG. 5. In one embodiment, the provider API comprises a registration interface IProviderRegistration 510 and the context provider 250-1 to 250-K may register with the context aware platform 100 using the IProviderRegistration interface 510.

In one embodiment, the provider manager 280 may use the context providers 250-1 to 250-K after the context providers 250-1 to 250-K get installed and registered with the context aware platform 100. In one embodiment, the installation process may include copying the files onto a memory such as the hard drive and y setting any configuration settings that may be specific to the sensors 210 that the context providers 250 support. After the installation, the provider manager 280 may allow the context providers 250 to register with the context aware platform 100.

In one embodiment, the RegisterProvider( ) may be used to indicate when the context provider 250 is installed and ready for use. In one embodiment, the RemoveProvider( ) may be used to remove the context provider 250 from the context aware platform 100, which may occur during the uninstalling process (i.e. before the files are deleted from the system). In one embodiment, the IProviderRegister may be used even while the context engine 150 may not be actively running. In one embodiment, the ProviderRegistationInfo interface may be used to describe the context providers 250, which may be registered and the XMLDoc that may be passed in as the RegistrationDetails parameter may describe all the context identifiers supported by the context providers 250.

In one embodiment, the provider manager 280 may use the IProviderControl interface 520 to complete the initialization process and to "activate" individual identifiers supported by the context providers 250 in addition to getting access to the IProviderData interface. In one embodiment, the provider manager 280 may use StartProvider( ) and StopProvider( ) interfaces to complete initialization, which may not be done while the context provider 250 is initially initialized. In one embodiment, the provider manager 280 may call the IProviderRegistration interface 510 before using the context provider 250 and the IProviderControl interface 520 before unloading the context provider 250.

In one embodiment, the provider manager 280 may use ActivateContext( ) to indicate to the context provider 250 the identifiers that may be used by the context aware platform 100. In one embodiment, the context provider 250 may power ON the platform resources including power to conserve the resources consumed by the sensors 210. In one embodiment, the context providers 250 power ON some of the hardware resources and load some of the software resources to provide information for the hardware and software resources that are activated. In one embodiment, after deactivation of the context providers 250 may turn OFF the sensors 210 and unload the unused hardware and software resources. In one embodiment, the provider manager 280 may enable the context provider 250 to activate and/or deactivate the individual identifiers multiple times during the life-span of a single instance of the context providers 250. In one embodiment, the GetProviderData( ) may return a reference to the IProviderData interface 530 which may be used to get the contextual information from the context provider 250.

In one embodiment, the provider manager 280 may use the IProviderData interface 530 to get the contextual information "on demand" by calling the GetData( ) method. In one embodiment, the provider manager 280 may use GetData( ) method frequently and the GetData( ) may be optimized to run quickly. In one embodiment, the IProviderData interface 530 may be used to get a reference to the IProviderNotifier interface 540, by calling GetProviderNotifier( ), for asynchronous notification.

In one embodiment, the provider manager 280 may use IProviderNotifier interface 540 to register for proactive notifications of data changes that may avoid the need to poll the context provider 250 for changes. In one embodiment, the provider manager 280 may instantiate an object that implements IProviderDataObserver such that a pointer to IProviderDataObserver interface may be passed in to RegisterObserver( ) and RemoveObserver( ) to start the event notifications and stop notifications. In one embodiment, the context providers 250 may support multiple observers.

In one embodiment, while registering, if the IProviderNotifier is used the observer object may be notified by the context provider 250 of the data changes using the IProviderDataObserver interface 550. In one embodiment, the context provider 250 may call the EventContextUpdateAvailable( ) to inform the provider manager 280 of the change in the data associated with a ContextName after the previous report provided by the context provider 250. In one embodiment, the control logic 240 may place the data into a queue and return control to the context provider 250. In one embodiment, the queue may be serviced by an internal thread by calling IProviderData::GetData( ) to get the latest data associated with a ContextName and to put the new context item into a context store.

In one embodiment, the context provider 250 may use EventIdentifierOnline( ) and EventIdentifierOffline( ) objects to notify the provider manager 280 if an identifier supported by the context provider 250 is temporarily unavailable. In one embodiment, the identifier may become unavailable for a variety of reasons. For example, the sensor 210 may be connected to the platform 100 using a serial or universal serial bus cable and a user may decouple the sensor 210 from the platform 100. In one embodiment, the context provider 250 may report out such an event as EventIdentiferOffline( ). In one embodiment, the context provider 250 may also use EventIdentifierOnline( ) to report out an event of reconnection of the sensor 210. Decoupling and coupling of the sensor 210 may be caused, for example, due to loss and establishment of wireless connectivity that may trigger an EventIdentifierOffline( ) and EventIdentifierOnline( ). While the identifier in the context provider 250 is in the Offline state, the provider manager 280 may not call the GetData( ) method to get contextual information.

Figure 6:
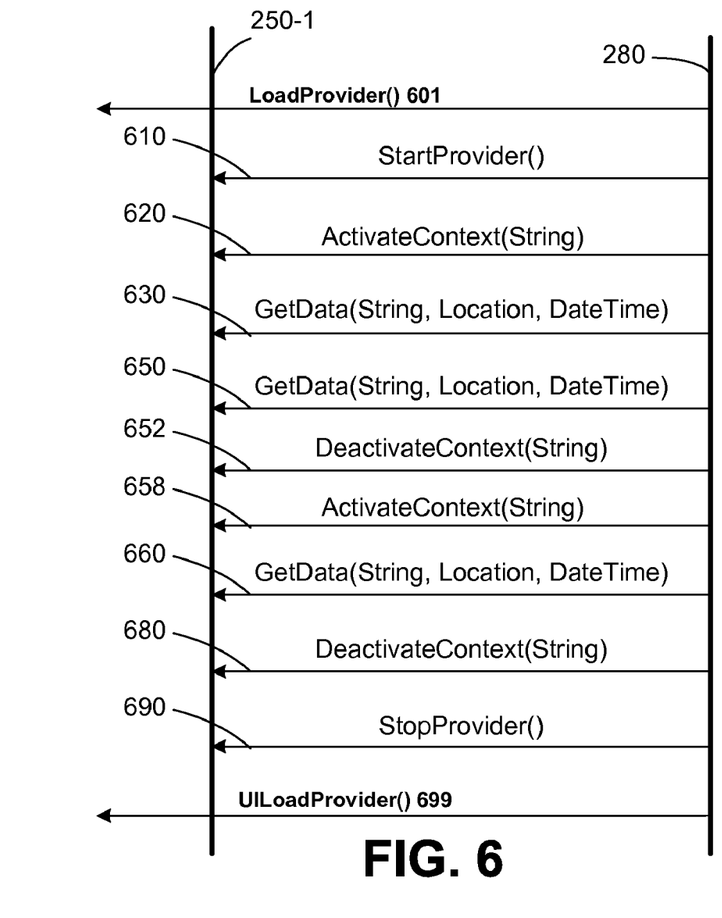
FIG. 6 illustrates a synchronous mode of communication between the context provider and the provider manager of the context engine according to an embodiment.

An embodiment of a synchronous mechanism enabling communication between the context provider 250-1 and the provider manager 280 is illustrated in FIG. 6. In one embodiment, the LoadProvider( ) 601 and UnloadProvider( ) 699 may be implemented by a operating system supported by the context aware platform 100. In one embodiment, the provider manager 280 may call the LoadPovider( ) 601 to load a specific context provider 250 and may call UnloadProvider( ) 699 to unload the earlier loaded context provider 250. In one embodiment, the context providers 250 may be loaded and unloaded and reloaded as determined by the provider manager 280. In one embodiment, the LoadProvider( ) 601 and UnloadProvider( ) 699 are shown outside the line representing 250 to indicate that the LoadProvider( ) 601 and UnloadProvider( ) 699 methods are not a part of the provider API.

In one embodiment, the provider manager 280 may call StartProvider( ) method 610 to allow the context provider 250-1 to perform initialization that may not be performed during initial initialization phase. In one embodiment, the provider manager 280 may perform ActivateContext(string) method 620, which may indicate to the context provider 250-1 the identifiers that may be used by the context aware platform 100. In one embodiment, the provider manager 280 may call GetData(String, Location, DateTime) multiple times to get the contextual information from the context provider 250-1. In one embodiment, the GetData( ) may return with contextual information (of string type), location details, and date and time details. In one embodiment, the multiple calls to the GetData( ) method may be represented by the calls 630, 650 and 660. In between multiple calls of GetData(String, Location, DateTime) method 650 and 660, the provider manager 280 may call DeactivateContext(String) 652 to deactivate the sensors 210 and may call ActivateContext (String) 658 to activate the sensors 210.

In one embodiment, the provider manager 280 may then perform the DeactivateContext(string) method 680 to deactivate the identifiers, which may not be used by the context aware platform 100. In one embodiment, the provider manager 280 may then call StopProvider( ) 690 before unloading the context provider 250-1. In one embodiment, the IProviderControl interface 520 may comprise the methods StartProvider( ) 610, ActivateContext( ) 620, GetData( ) 630, 650, and 660, DeactivateContext( ) 680, and the StopProvider( ) 690.

Figure 7:
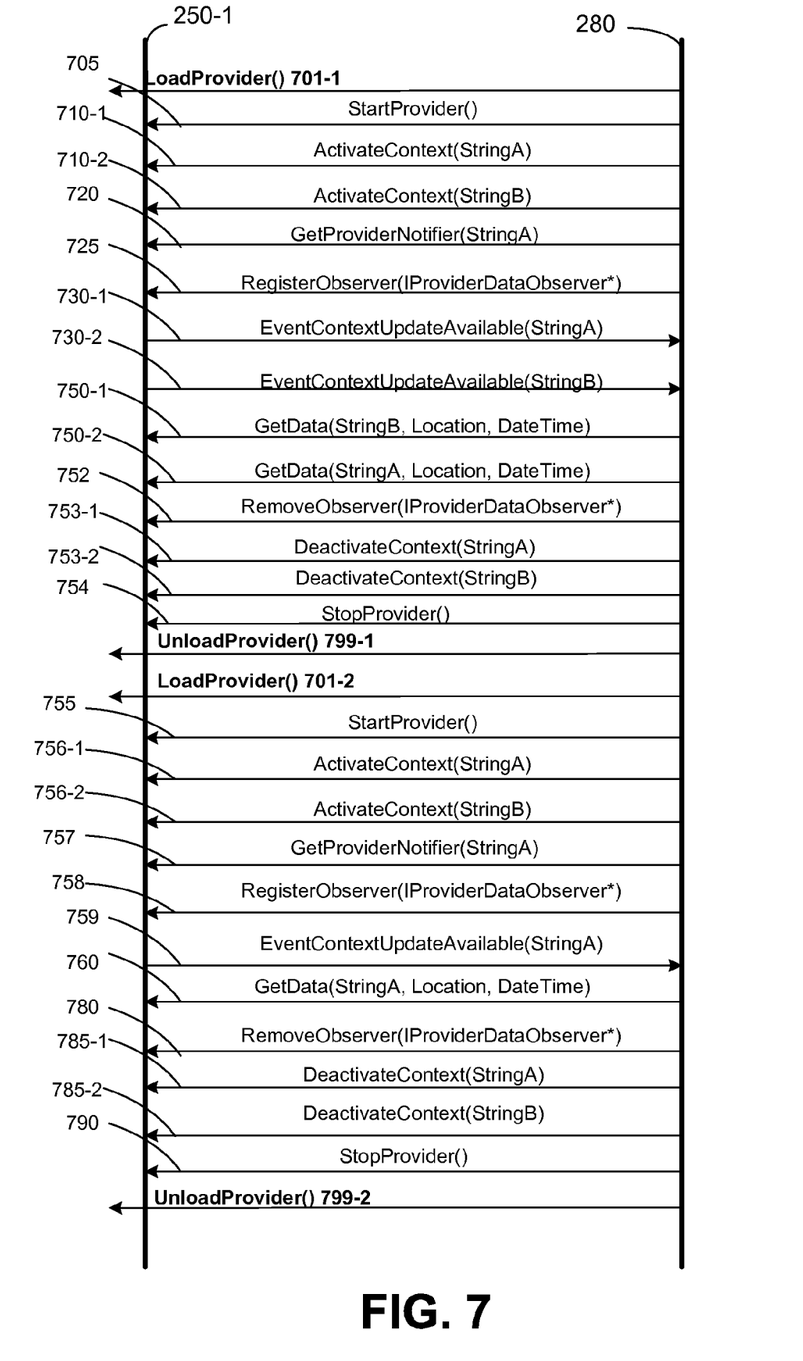
FIG. 7 illustrates an asynchronous mode of communication between the context provider and the provider manager of the context engine according to an embodiment.

An embodiment of an asynchronous mechanism enabling communication between the context provider 250-1 and the provider manager 280 is illustrated in FIG. 7. In one embodiment, the LoadProvider( ) 701 and UnloadProvider( ) 799 may be implemented by a operating system supported by the context aware platform 100. In one embodiment, the provider manager 280 may call the LoadPovider( ) 701-1 and 701-2 to load a specific context provider 250 and may call UnloadProvider( ) 799-1 and 799-2 to unload the earlier loaded context provider 250. In one embodiment, the context providers 250 may be loaded and unloaded and reloaded as determined by the provider manager 280. In one embodiment, the LoadProvider( ) 701-1 and 701-2 and UnloadProvider( ) 799-1 and 799-2 are shown outside the line representing 250 to indicate that the LoadProvider( ) 701-1 and 701-2 and UnloadProvider( ) 799-1 and 799-2 methods are not a part of the provider API.

In one embodiment, the provider manager 280 may call StartProvider( ) method 705 to allow the context provider 250-1 to perform initialization that may not be performed during initial initialization phase. In one embodiment, the provider manager 280 may perform ActivateContext (stringA) method 710-1 and ActivateContext(stringA) method 710-2, which may indicate to the context provider 250-1 the identifiers that may be used by the context aware platform 100. In one embodiment, the provider manager 280 may call GetProviderNotifier(String) 720, which may be used for asynchronous data notification. In one embodiment, the provider manager 280 may use RegisterObserver(ProviderDataObserver*) method 725 so that a pointer to method 725 may be passed in to RegisterObserver( ) to start the event notifications.

In one embodiment, the context provider 250-1 may call the EventContextUpdateAvailable(StringA) 730-1 and EventContextUpdateAvailable(StringB) 730-2 to inform the provider manager 280 of the change in the data associated with a ContextName after the previous report provided by the context provider 250-1. In one embodiment, the context provider 250-1 may call the EventContextUpdateAvailable (StringA) 730-1 and EventContextUpdateAvailable(StringB) 730-2 multiple times and FIG. 7 depicts that the context provider 250-1 calls the EventContextUpdateAvailable (String) thrice 730-1 and 730-2 and 759.

In one embodiment, the provider manager 280 may call GetData(StringB, Location, DateTime) 750-1 and GetData (StringA, Location, DateTime) 750-2 multiple times to get the contextual information from the context provider 250-1. In one embodiment, the GetData( ) may return with contextual information (of string type), location details, and date and time details. In one embodiment, the multiple calls to the GetData( ) method may be represented by the calls 750-1, 750-2 and 760.

In one embodiment, the provider manager 280 may use RemoveObserver(IProviderObserver*) 752 such that a pointer to IProviderDataObserver interface may be passed in to RemoveObserver( ) to stop notifications. In one embodiment, the provider manager 280 may then perform the DeactivateContext(stringA) method 753-1 and DeactivateContext (stringA) method 753-2 to deactivate the identifiers, which may not be used by the context aware platform 100. In one embodiment, the provider manager 280 may then call StopProvider( ) 754 before unloading the context provider 250-1 using UnloadProvider( ) 799-1. In one embodiment, the ActivateContext(StringA) 710-1 and ActivateContext(StringB) 710-2 may, respectively, activate the sensors 210-A and 210-B, for example. In one embodiment, the In one embodiment, the DeactivateContext(StringA) 753-1 and DeactivateContext(StringB) 753-2 may, respectively, deactivate the sensors 210-A and 210-B, for example.

In between UnloadProvider( ) 799-1 and LoadProvider( ) 701-2, the provider manager 280 and the context provider 250 may not, respectively, call the GetData( ) and EventContextUpdateAvailable( ) 730 methods. In one embodiment, after the context provider 250 may be reloaded by performing LoadProvider( ) 701-2 and the sequence of events such as the StartProvider( ) 755, ActivateContext(StringA) 756-1, ActivateContext(StringB) 756-2, GetProviderNotifier(StringA) 757, RegisterObserver(IProviderDataObserver*) 758, EventContextUpdateAvailable(StringA) 759, GetData (StringA, Location, DateTime) 760, RemoveObserver(IProviderObserver*) 780, DeactivateContext(StringA) 785-1 and DeactivateContext(StringB) 785-2 and StopProvider( ) 790 may be called before unloading UnloadProvider( ) 799-2 the context provider 250-1.

Figure 8:
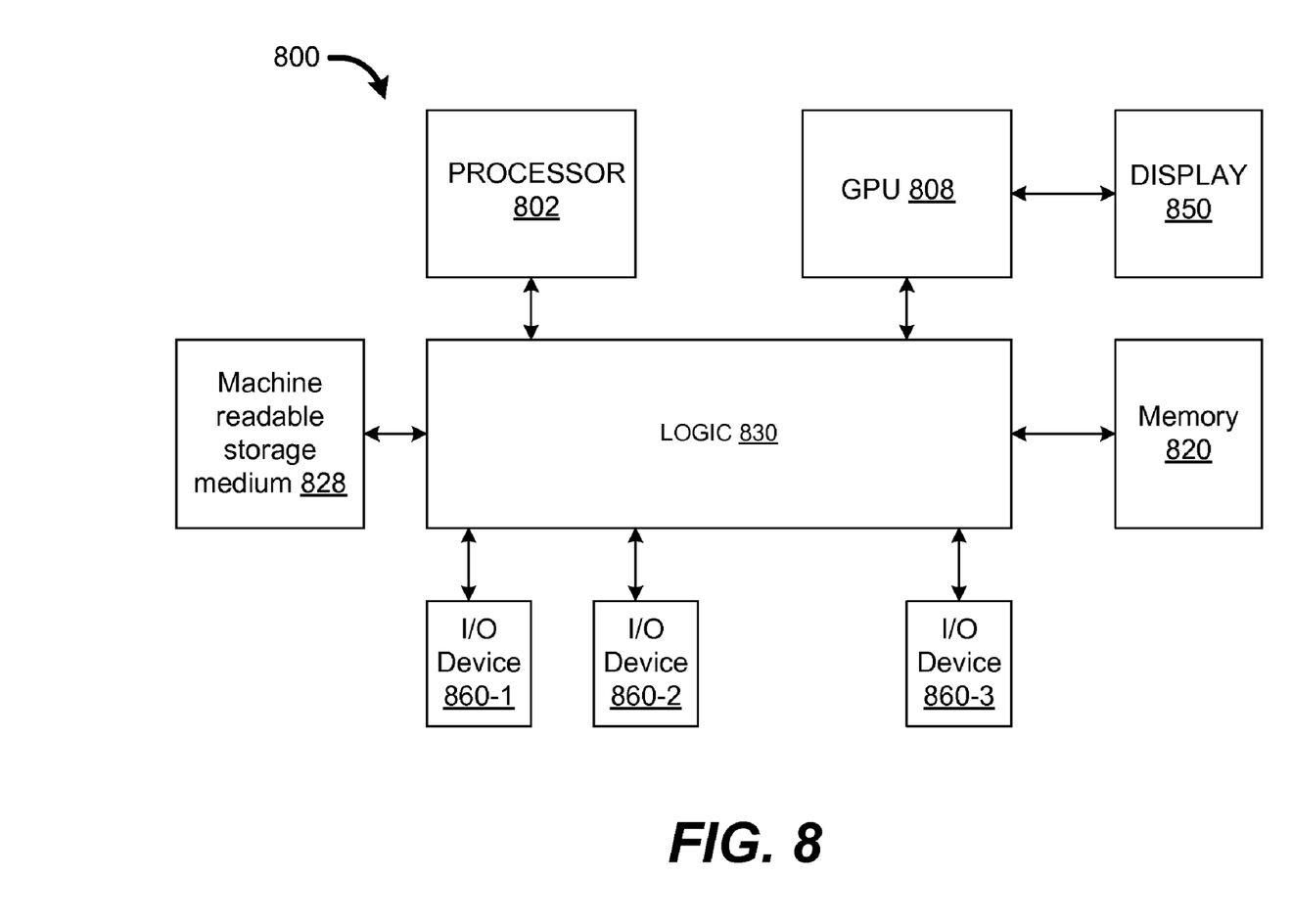
FIG. 8 is a computer system, which may support context awareness while handling sensors according to one embodiment.

Referring to FIG. 8, a computer system 800 supporting a context aware platform 100 may comprise a processor 802, which may include a single instruction multiple data (SIMD), reduced instruction set (RISC), and such other similar general purpose processors and a graphics processor unit (GPU) 805. The processor 802, in one embodiment, may process a sequence of instructions, to provide and execute the codes for the context providers 250, the provider manager 280, and the clients 180, which may be stored in machine readable storage medium 825. However, the sequence of instructions may also be stored in the memory 820 or in any other suitable storage medium.

The processor 802 that operates the computer system 800 may be one or more processor cores coupled to logic 830. In one embodiment, the processor 810 may comprise a central processing unit and a memory subsystem. In one embodiment, the context providers 250 and the provider manager 280 may together provide a unified approach to, dynamically, load and/or unload context providers 250, which may activate and/or deactivate sensors 210 while conserving the resources such as the power, memory space consumed by the sensors 210 and the context providers 250 coupling the sensors 210 to the context aware platform 100 in a loaded state.

The logic 830, for example, could be chipset logic in one embodiment. The logic 830 is coupled to the memory 820, which can be any kind of storage, including optical, magnetic, or semiconductor storage. The I/O devices 860 may allow the computer system 800 to interface with the devices such as the sensors 210-A to 210-N.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to handle a plurality of sensors in a context aware platform comprising:
   providing an application programming interface to enable communication between a provider manager and a plurality of context providers,
   generating, in response to a request from a client device for sensor data, a hint signal based on predicted usage levels of the plurality of sensors, wherein the hint signal is to specify preferred activity level of the plurality of sensors,
   activating a first set of sensors coupled to the context provider if the preferred activity level for the first set of sensors is set to activate state in the hint signal, wherein the plurality of sensors include the first set of sensors,
   getting contextual information from the first set of sensors using the application programming interface, wherein the communication between the context provider and the provider manager includes either a synchronous access mechanism or an asynchronous access mechanism,
loading a context provider of the plurality of context providers if a first value is stored in a load field of the hint signal, and
unloading the context provider if a second value is stored in the load field of the hint signal.

2. The method of claim 1 comprises deactivating second set of sensors coupled to the context provider if the preferred activity level for the second set of sensors is set to deactivate state in the hint signal, wherein plurality of sensors include the second set of sensors.

3. The method of claim 2 further comprises unloading the context provider if the preferred activity level of the first set of sensors and the second set of sensors is set to deactivate state in the hint signal.

4. The method of claim 1 further comprises transferring the contextual information of a sensor of the first set of sensors to a first client of the client entities, wherein the sensor is logically coupled to the first client.

5. The method of claim 1 further comprises determining the predicted usage levels for the plurality of sensors by tracking usage patterns of first and the second set of sensors by the client entities.

6. The method of claim 5 further comprises activating and preserving the state of sensors already activated, speculatively, based on the usage patterns, wherein the usage patterns include probability values indicating probability of use of the plurality of sensors by the client entities and frequency values indicating the frequency of use of the plurality of sensors by the client entities.

7. A system to handle sensors in a context aware platform comprising:
a context engine including a provider manager coupled to a plurality of context providers, wherein the provider manager is to provide an application programming interface to enable communication between the provider manager and the plurality of context providers,
wherein the provider manager is to generate, in response to a request from a client device for sensor data, a hint signal based on predicted usage levels of the sensors, wherein the hint signal is to specify preferred activity level of the sensors,
wherein the provider manager is to load a context provider of the plurality of context providers if a first value is stored in a load field of the hint signal,
wherein the context provider is to activate the first set of sensors of the plurality of sensors if the preferred activity level for the first set of sensors is set to activate state in the hint signal, wherein the first set of sensors is coupled to the context provider,
wherein the provider manager is to unload the context provider if a second value is stored in the load field of the hint signal,
wherein the provider manager and the context provider are to communicate using either a synchronous access mechanism or an asynchronous access mechanism,
wherein a first set and a second set of the sensors is coupled to the context provider, and
wherein the context provider is to acquire contextual information from the first set of sensors before providing the contextual information to the provider manager.

8. The system of claim 7, wherein the context provider is to deactivate the second set of sensors of the plurality of sensors if the preferred activity level of the second set of sensors is set to deactivate state in the hint signal, wherein the second set of sensors is coupled to the context provider.

9. The system of claim 8, wherein the provider manager is to unload the first context provider if the preferred activity level of the first set of sensors and the second set of sensors is set to deactivate state.

10. The system of claim 7 further comprises a control logic and a client interface, wherein the control logic is coupled to the provider manager and the client interface, wherein the client logic is to transfer the contextual information of a sensor of the first set of sensors to a first client of the client entities based on the contextual information received from the provider manager and control signal received from the control logic, wherein the sensor is logically coupled to the first client.

11. The system of claim 7, wherein the provider manager is determine the predicted usage levels of the sensors by tracking usage patterns of the client entities.

12. The system of claim 11, wherein the provider manager is to activate and preserve state of sensors already activated, speculatively, based on the usage patterns, wherein the usage patterns include probability values indicating probability of use of the plurality of sensors by the client entities and frequency values indicating the frequency of use of the plurality of sensors by the client entities.

13. A non-transitory machine-readable storage medium to handle a plurality of sensors in a context aware platform comprising a plurality of instructions that in response to being executed result in a processor comprising:
providing an application programming interface to enable communication between a provider manager and a plurality of context providers,
generating, in response to a request from a client device for sensor data, a hint signal based on predicted usage levels of the plurality of sensors, wherein the hint signal is to specify preferred activity level of the plurality of sensors,
activating a first set of sensors coupled to the context provider if the preferred activity level for the first set of sensors is set to activate state in the hint signal, wherein the plurality of sensors include the first set of sensors,
getting contextual information from the first set of sensors using the application programming interface, wherein the communication between the context provider and the provider manager includes either a synchronous access mechanism or an asynchronous access mechanism,
loading a context provider of the plurality of context providers if a first value is stored in a load field of the hint signal, and
unloading the context provider if a second value is stored in the load field of the hint signal.

14. The non-transitory machine-readable storage medium of claim 13 comprises deactivating second set of sensors coupled to the context provider if the preferred activity level for the second set of sensors is set to deactivate state in the hint signal, wherein plurality of sensors include the second set of sensors.

15. The non-transitory machine-readable storage medium of claim 14 further comprises unloading the context provider if the preferred activity level of the first set of sensors and the second set of sensors is set to deactivate state in the hint signal.

16. The non-transitory machine-readable storage medium of claim 13 further comprises transferring the contextual information of a sensor of the first set of sensors to a first client of the client entities, wherein the sensor is logically coupled to the first client.

17. The non-transitory machine-readable storage medium of claim 13 further comprises determining the predicted usage levels for the plurality of sensors by tracking usage patterns of first and the second set of sensors by the client entities.

18. The non-transitory machine-readable storage medium of claim 17 further comprises activating and preserving the state of sensors already activated, speculatively, based on the usage patterns, wherein the usage patterns include probability values indicating probability of use of the plurality of sensors by the client entities and frequency values indicating the frequency of use of the plurality of sensors by the client entities.

* * * * *